US010970380B2

(12) United States Patent
Hao et al.

(10) Patent No.: US 10,970,380 B2
(45) Date of Patent: Apr. 6, 2021

(54) INTERNET-OF-THINGS PARTNER INTEGRATION

(71) Applicant: Verizon Patent and Licensing Inc., Arlington, VA (US)

(72) Inventors: Jianxiu Hao, Acton, MA (US); Zhong Chen, Acton, MA (US); Lin Zhu, Lexington, MA (US); Ming Chen, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 899 days.

(21) Appl. No.: 15/180,361

(22) Filed: Jun. 13, 2016

(65) Prior Publication Data

US 2017/0359237 A1    Dec. 14, 2017

(51) Int. Cl.
*G06F 15/16* (2006.01)
*G06F 21/44* (2013.01)
(Continued)

(52) U.S. Cl.
CPC .............. *G06F 21/44* (2013.01); *H04L 67/02* (2013.01); *H04W 12/0609* (2019.01);
(Continued)

(58) Field of Classification Search
CPC . H04L 67/02; H04L 61/2007; H04L 63/0236; H04L 63/0245; H04L 63/08;
(Continued)

(56) References Cited

U.S. PATENT DOCUMENTS 9,544,351 B1 * 1/2017 Lee .................... H04L 67/1097
2010/0050189 A1 * 2/2010 Sng ......................... G06F 9/545
719/321
(Continued)

FOREIGN PATENT DOCUMENTS

CN       205594894 U  * 9/2016

OTHER PUBLICATIONS

Active connection management in Internet services M.Y. Chen;E. Brewer NOMS 2002. IEEE/IFIP Network Operations and Management Symposium. ' Management Solutions for the New Communications (Year: 2002).*

*Primary Examiner* — Oscar A Louie
*Assistant Examiner* — Oluwatosin M Gidado

(57) ABSTRACT

A network device logs transmission control protocol (TCP) flow data for connections between registered devices that are registered for use of secure Internet of Things (IoT) application programming interfaces (APIs). The logging generates logged flow data. The network device receives, from a first registered device, a call validation request for an IoT API call directed to the first registered device from a second registered device. The call validation request includes packet information of the IoT API call. The network device compares the packet information with the logged TCP flow data. When the comparing indicates a match of the packet information and the logged TCP flow data, the network device sends a response to the first registered device to accept the IoT API call. Otherwise, the network device sends a response to the first registered device to reject the IoT API call.

20 Claims, 10 Drawing Sheets

(51) Int. Cl.
*H04L 29/08* (2006.01)
*H04W 12/06* (2021.01)
*H04W 12/08* (2021.01)
*H04L 29/12* (2006.01)
*H04L 29/06* (2006.01)
*H04W 4/70* (2018.01)

(52) U.S. Cl.
CPC ..... H04W 12/0808 (2019.01); *H04L 61/2007* (2013.01); *H04L 63/0236* (2013.01); *H04L 63/0245* (2013.01); *H04L 63/08* (2013.01); *H04L 63/107* (2013.01); *H04L 67/12* (2013.01); *H04W 4/70* (2018.02)

(58) Field of Classification Search
CPC ......... H04L 63/107; H04L 67/12; G06F 9/00; G06F 21/44; H04W 12/08; H04W 4/70; H04W 12/06
USPC ........................................................ 709/218
See application file for complete search history.

(56) References Cited

U.S. PATENT DOCUMENTS

| | | | |
|---|---|---|---|
| 2013/0124738 A1* | 5/2013 | Lynch | H04L 12/6418 709/227 |
| 2013/0244614 A1* | 9/2013 | Santamaria | H04L 51/04 455/411 |
| 2014/0269728 A1* | 9/2014 | Jalan | H04L 45/306 370/392 |
| 2015/0249585 A1* | 9/2015 | Shomura | H04L 67/02 709/224 |
| 2015/0281178 A1* | 10/2015 | Raman | H04L 63/0227 726/13 |
| 2016/0014790 A1* | 1/2016 | Takehana | H04W 72/085 370/329 |
| 2016/0371484 A1* | 12/2016 | Mehta | G06F 21/54 |
| 2017/0005820 A1* | 1/2017 | Zimmerman | H04L 67/10 |
| 2017/0083396 A1* | 3/2017 | Bishop | G06F 11/1438 |
| 2017/0126475 A1* | 5/2017 | Mahkonen | H04L 43/04 |

\* cited by examiner

INTERNET-OF-THINGS PARTNER INTEGRATION

BACKGROUND

The Internet of Things (IoT) may be described as a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device, such as a coordinator, a gateway, etc.) or directly. Since IoT technology has nearly limitless applications that can be leveraged to form new and useful services, interest among service providers and developers in IoT technology continues to increase.

DETAILED DESCRIPTION OF THE PREFERRED EMBODIMENTS

The following detailed description refers to the accompanying drawings. The same reference numbers in different drawings may identify the same or similar elements.

The Internet of Things (IoT) space is massive but fragmented, forming what may be referred to as "information silos" where data from different types of devices may not be accessible. For example, a manufacture of locks, selling a new IoT lock for a front door, will not only make the lock but also a mobile application (or "app") and possibly a cloud platform to support the remote lock/unlock operations from the mobile app. Such an environment may distance the manufacturer from its core competency, since building door locks is their expertise but building apps may not be. At the same time on the consumer side, the lock manufacture has an app in the app store to lock and unlock, a light manufacture has another app to control light on and off, and a garage door opener manufacturer may have yet another app for the garage door openers. Original equipment manufacturers (OEMs) may benefit from standards specifications or software development kits (SDK) that can be embedded into devices before connecting to a service provider networks.

An application programming interface (API) uses a collection of software functions and procedures, referred to as API calls, that can be executed by other software applications. Service providers (e.g., telecommunications providers) may provide APIs that OEM partners can use to develop solutions for use of IoT data. Simplified app development and standardization may be achieved by providing open APIs and portals for developers to use. However, with standardized API calls and unified interfaces, security for the API calls related to IoT devices becomes a challenge. Implementations described herein provide an IoT application framework that offers reliable security measures for IoT API calls.

According to an implementation herein, a method is performed by a network device. The network device logs transmission control protocol (TCP) flow data for connections between registered devices that are registered for use of secure IoT APIs. The logging may generate logged flow data. The network device may receive, from a first registered device, a call validation request for an IoT API call directed to the first registered device from a second registered device. The call validation request may include packet information of the IoT API call. The network device may compare the packet information with the logged TCP flow data. When the comparing indicates a match of the packet information and the logged TCP flow data, the network device may send a response to the first registered device to accept the IoT API call. When the comparing indicates no match, the network device may send a response to the first registered device to reject the IoT API call.

Figure 1:
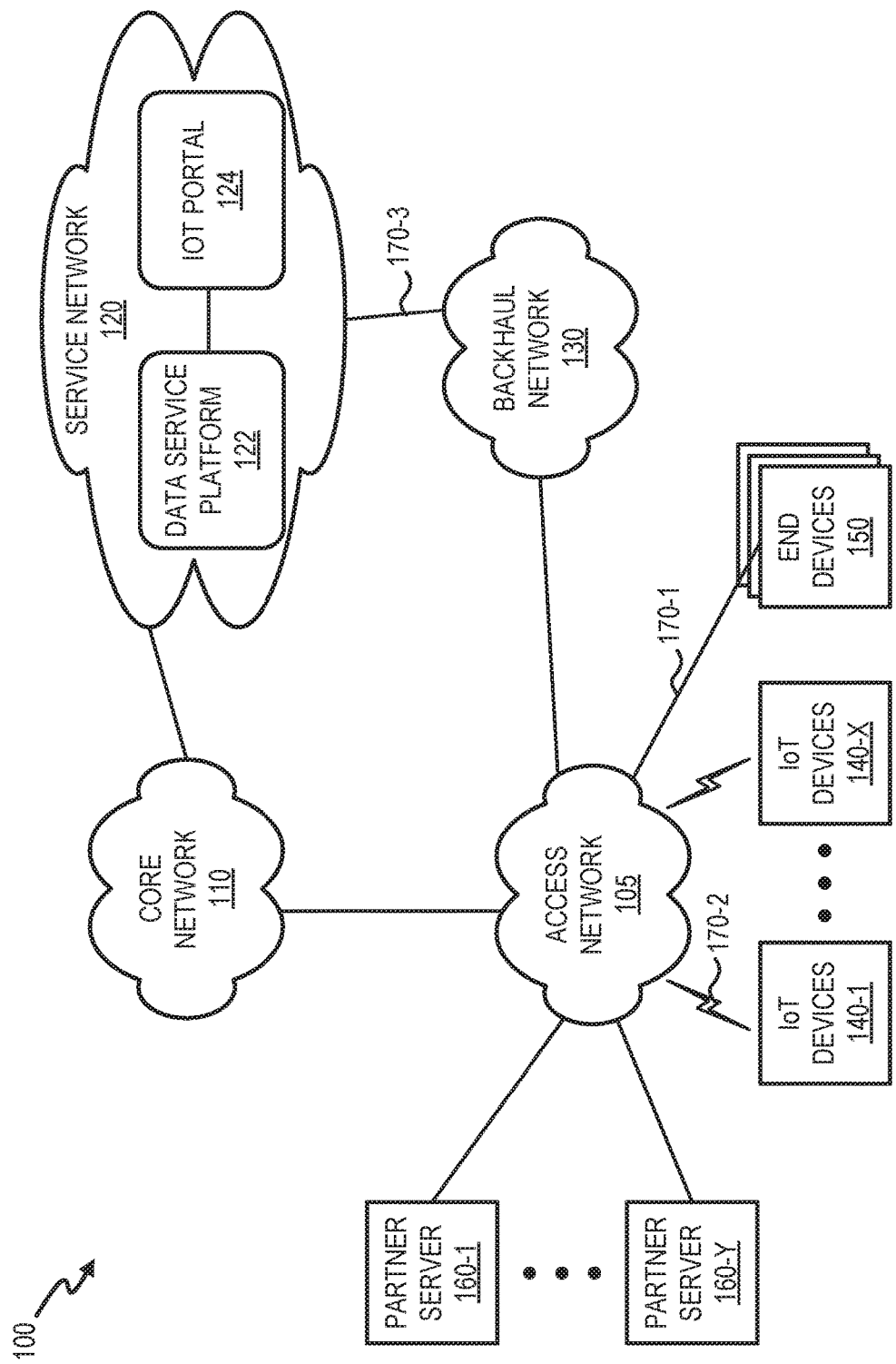
FIG. 1 is a diagram that depicts an exemplary network environment in which systems and methods described herein may be implemented.

FIG. 1 is a diagram illustrating an exemplary environment 100 in which systems and methods described herein may be implemented. As illustrated, environment 100 may include an access network 105, a core network 110, a service network 120, and a backhaul network 130. Service network 120 may have multiple network elements including, but not limited to, a data service platform 122 and an IoT portal 124. Environment 100 may also include IoT devices 1 through 140-X (also referred to as collectively as "IoT devices 140" and, individually or generically as "IoT device 140"), end devices 150, and partner servers 160-1 through 160-Y (also referred to as collectively as "partner servers 160" and, individually or generically as "partner server 160"). For purposes of description, IoT devices 140, end devices 150, and partner servers 160 are considered network elements and a part of an IoT application framework.

As further illustrated, environment 100 includes communicative links 170 between the network elements and networks (although only three are referenced in FIG. 1 as links 170-1, 170-2, and 170-3). A network element may transmit and receive data via a link 170. Environment 100 may be implemented to include wireless and/or wired (e.g., electrical, optical, etc.) links 170. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple data service platforms 122, IoT platforms 124, and so forth. Additionally, or alternatively, according to other embodiments, multiple network elements may be implemented on a single device, and conversely, a network element may be implemented on multiple devices. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RAN described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes data service platform 122 and IoT portal 124. According to other exemplary embodiments, data service platform 122, IoT portal 124, and/or a portion thereof may be implemented in core network 110.

Data service platform 122 includes one or more network devices that provide advanced network services in addition to traditional services, such as Transport Control Protocol (TCP) optimization, traffic shaping, and traffic statistic collections. Additionally, data service platform 122 provides an IoT data service. The IoT data service includes receiving all packets that are transmitted by IoT devices 140. Upon receipt of the packets, the IoT data service inspects each packet, identifies data that can be linked to IoT data carried in a packet, retrieves the linked data, and aggregates the IoT data with the linked data. The aggregated data is made available to users of IoT portal 124. Data service platform 122 is described further in connection with FIG. 2.

Figure 2:
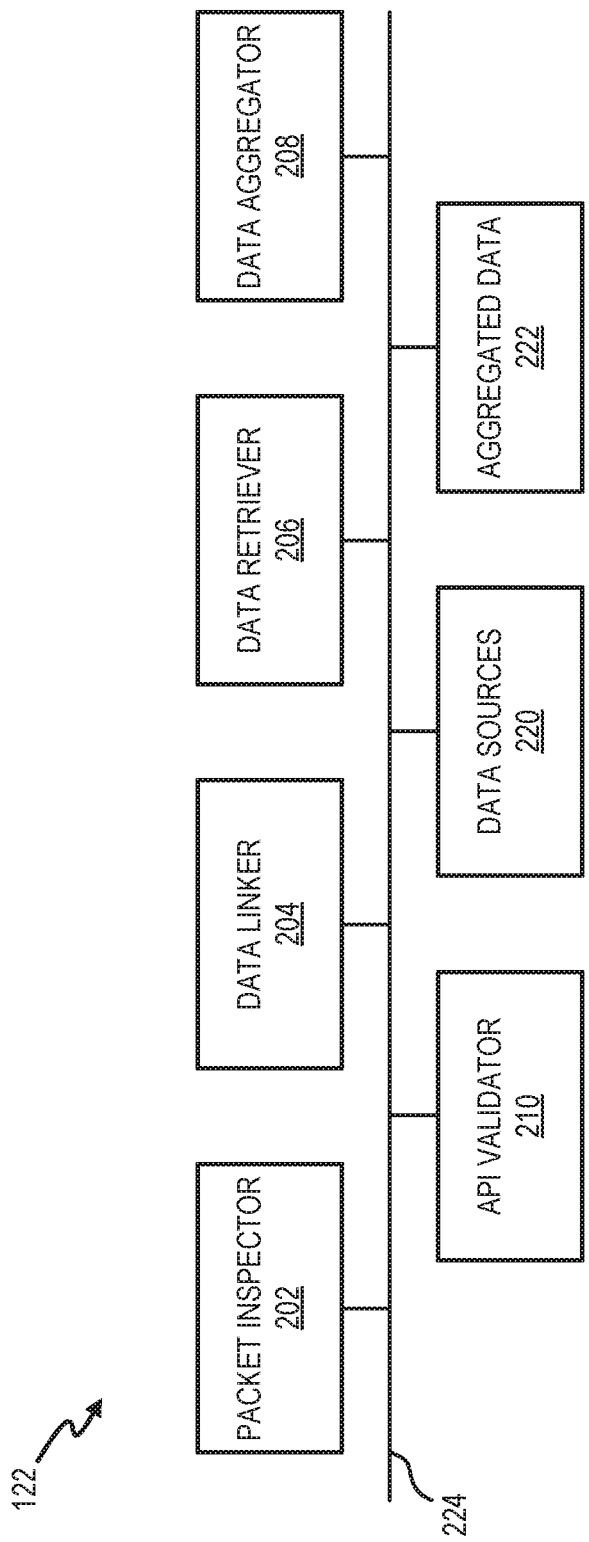
FIG. 2 is a diagram illustrating exemplary network elements of a data service platform depicted in the environment of FIG. 1.

FIG. 2 is a diagram of exemplary network elements of data service platform 122. As illustrated in FIG. 2, data service platform 122 may include a packet inspector 202, a data linker 204, a data retriever 206, a data aggregator 208, and an API validator 210. Additionally, data service platform 122 includes data sources 220 and aggregated data 222. According to other exemplary embodiments, data service platform 122 may include additional, fewer, and/or different network elements than those illustrated in FIG. 2 and described herein. Packet inspector 202, data linker 204, data retriever 206, data aggregator 208, API validator 210, data sources 220, and/or aggregated data 222 may be connected to, and communicate with each other, via a hardware link (e.g., a data bus, a system bus, a control bus), a software link (e.g., an application program interface (API), inter-process communication (IPC), etc.) or an inter-network device link (e.g., link 170) via a link 224.

According to an exemplary embodiment, packet inspector 202 includes logic that identifies packets, such as packets for IoT APIs and packets carrying IoT data. A packet may include a data unit such as a packet, datagram, cell, or other type of encapsulated data. In one implementation, packet inspector 202 may identify TCP flow data for each TCP session between registered devices (e.g., IoT devices 140 and/or partner servers 160). Particularly, packet inspector 202 may maintain a real-time log of TCP flow data. According to one implementation, packet inspector 202 uses a packet filtering method. As a result of the packet filtering, packet inspector 202 obtains TCP flow data (which may include a source IP address, source port, destination IP address, destination port, and time) from network protocols and/or other data (e.g., a device identifier of IoT device 140, etc.). According to one implementation, packet inspector 202 obtains information from packet headers. According to another implementation, packet inspector 202 uses another packet inspection method. For example, packet inspector 202 may perform deep packet inspection. As a result of the packet inspection, packet inspector 202 obtains network protocol data (e.g., source IP address, destination IP address) and, other header data (e.g., size of datagram, etc.), payload data (e.g., IoT data), a device identifier of IoT device 140, etc. Depending on the protocol stack used by IoT device 140 to transmit the IoT data, packet inspector 202 may identify various types of data.

According to one exemplary implementation, when IoT device 140 is assigned a static IP address, packet inspector 202 determines that the packet pertains to a particular IoT device 140 based on the static IP address. For example, in an LTE network or an LTE-A network, data service platform 122 may interface with various network elements of core network 110 (e.g., a home subscriber server (HSS), a packet data network gateway (PGW), a mobility management entity (MME), etc.). According to an implementation, the HSS stores a subscriber profile pertaining to IoT device 140. The subscriber profile may include a static IP address, as well as other subscription data (e.g., a device identifier, etc.). By way of further example, in view of the address space afforded by IPv6, IoT device 140 may be assigned a static IPv6 address. Based on the subscriber profile, packet inspector 202 may identify a packet pertaining to the particular IoT device 140. According to another implementation, data service platform 122 may locally store a database. The database may store subscriber profiles that include static IP addresses assigned to IoT devices 140 and other subscription data. In another implementation, the database may store real-time TCP session data for registered devices using data service platform 122.

According to various implementations, IP address assignment relative to IoT device 140 may occur during initial attachment to access network 105 and core network 110 or subsequently in accordance with a communication standard (e.g., a 3GPP LTE standard, etc.). IoT device 140 may transmit an attachment request, which includes a device identifier pertaining to IoT device 140. IoT device 140 may be assigned an IPv6 address or an IPv4 address. Subsequent to assignment of the IP address, packet inspector 202 of data service platform 122 may identify packets that pertain to a particular IoT device 140.

According to an exemplary embodiment, data linker 204 includes logic to select a type of linked data to obtain based on the data identified and/or obtained by packet inspector 202. For example, the identified and/or obtained data may include a source network address, a device identifier, and/or IoT data. As described above, linked data is intended to mean any data that supplements or augments the IoT data. The linked data may include various types of data. For example, the linked data may include timestamp data (e.g., time or date and time) pertaining to when the IoT data was transmitted by IoT device 140 and/or when the IoT data was received by data service platform 122, location data of IoT device 140 (e.g., longitude and latitude, a name of a place, a street address, city, state, zip code), an IoT device identifier (e.g., an equipment identifier, a device name, etc.), a mobile phone number of IoT device 140, a user identifier associated with IoT device 140 (e.g., an International Mobile Subscriber Identity (IMSI) or the like), an IoT device 140 that is a neighbor or a part of a group of IoT devices 140 to which the transmitting IoT device 140 belongs, and/or other metadata, such as environmental data (e.g., weather, etc.), contextual data (time, locale, events, etc., pertaining to IoT device 140/IoT data), or advertisement data (e.g., products, services, etc., pertaining to the location of IoT device 140, etc.) that can be mapped to or correlate with IoT device 140.

According to an exemplary implementation, data linker 204 selects the type of linked data to obtain based on a subscriber profile. For example, a user may register with the IoT application framework and services via IoT portal 124 during which the subscriber profile is created. The user may select APIs, which provide access to and use of linked data, via an IoT software application development service of IoT portal 124. The software application being developed may use the linked data to support a service. The subscriber profile may indicate certain types of linked data in support of the selected APIs. Data linker 204 may select the linked data based on the subscriber profile and/or other data obtained from packet inspector 202 (e.g., source IP address, device identifier, etc.). Data linker 204 may instruct data retriever 206 as to the type of linked data to obtain relative to one or more packets inspected.

According to an exemplary embodiment, data retriever 206 includes logic to obtain the linked data from various sources, such as data sources 220. For example, data retriever 206 includes logic to search, perform lookups, query, etc., data sources 220 to obtain the linked data.

Data sources 220 may include web servers, third party devices, network elements in core network 110 and/or access network 105, various databases, and so forth. For example, data sources 220 may include various servers that provide various types of linked data pertaining to weather, advertisements, user account information (e.g., HSS), etc. Since some linked data may change over time, data retriever 206 may update the linked data using well-known techniques polling, etc). Data retriever 206 passes the obtained linked data to data aggregator 208.

According to an exemplary embodiment, data aggregator 208 includes logic to aggregate and store the IoT data with the linked data. Data aggregator 208 stores aggregated data 222 in a repository (e.g., a database, a data structure, etc.). Aggregated data 222 is made available to the selected APIs in support of a service offered by the software application. For example, data aggregator 208 may store aggregated data 222 in a dedicated database that is accessible to the software application. According to other exemplary embodiments, data aggregator 208 includes logic to store the linked data and the IoT data separately, which is made available to the selected APIs. That is, data aggregator 208 may not aggregate the IoT data with the linked data.

API validator 210 includes logic that will validate an initial IoT API call from IoT device 140 or partner server 160 to make sure the call is indeed from the claimed registered device. Additionally, API validator 210 may validate an answer (to the API call) from partner server 160 or IoT device 140 to confirm that the answer is actually from the claimed registered device. For example, when IoT device 140 receives an API call, IoT device 140 may send a validation request to API validator 210. API validator 210 may receive the validation request and pass packet identifiers to packet inspector 202 for verification. Packet inspector 202, in turn, may verify, in real time, a data flow with matching information is in the network. API validator 210 may, in turn, provide a validation response to partner server 160 to either accept or reject the API call.

Referring again to FIG. 1, according to an exemplary embodiment, IoT portal 124 includes a network device that provides IoT management services. Users of the IoT application framework may manage (e.g., configure, issue commands, update, monitor, etc.) IoT devices 140 and other network elements IoT data, linked data, aggregated data, etc.) via end device 150. IoT portal 124 may provide various IoT management services such that a user may manage on-the-fly and/or remotely. Additionally, IoT portal 124 may allow users to manage in an automated manner based on a management schedule. For example, a user may configure a time schedule during which IoT configuration data (e.g., a software update) pertaining to multiple IoT devices 140 is updated.

According to an implementation, IoT portal 124 may include a network device that provides an IoT software application development service. The IoT software application development service provides access to and use of APIs that may be used to develop a software application. The software application may use an API to hook into the linked data (of data sources 220) or aggregated data 222 so as to provide a service afforded by the software application. The IoT software application development service also provides software development kits (SDKs) that assist users to develop the software application for various end devices 150. Additionally, the IoT software application development service also provides a sample software application that illustrates how the APIs work, which may assist users during the development stage. IoT portal 124 is described further in connection with FIG. 3.

Figure 3:
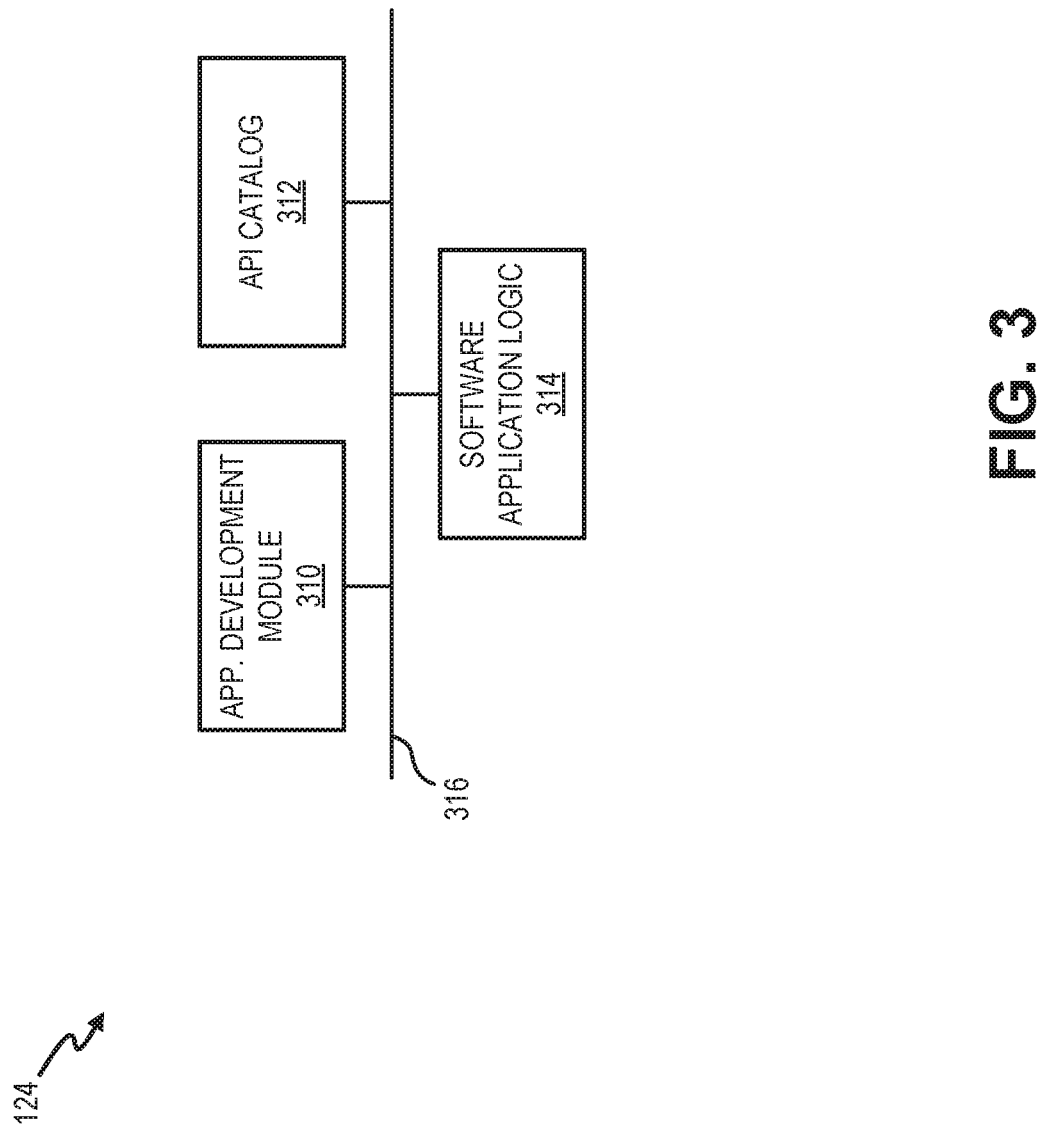
FIG. 3 is a diagram illustrating exemplary network elements of an IoT portal depicted in the environment of FIG. 1.

FIG. 3 is a diagram illustrating exemplary network elements of IoT portal 124. For example, as illustrated, IoT portal 124 may include application development module 310, API catalog 312, and software application logic 314. According to other exemplary embodiments, IoT portal 124 may include additional, fewer, and/or different network elements than those illustrated in FIG. 3 and described herein. For example, IoT portal 124 may include authentication logic, data linking logic, scheduling logic, and other network elements to permit execution of software applications on end devices 150. Application development module 310, API catalog 312, and software application logic 314 may be connected to and communicate with each other via a hardware link (e.g., a data bus, a system bus, a control bus), a software link (e.g., an API, IPC, etc.) or an inter-network device link (e.g., link 170) via a link 316. Each of application development module 310 and software application logic 314 may provide a graphical user interface that allows a subscriber (e.g., a user of end device 150) to use the various services and perform various tasks as described herein.

Application development module 310 includes logic that provides an IoT software application development service. For example, the IoT software application development service provides users (e.g., of end device 150) access to API catalog 312. The APIs in API catalog 312 may be used by users to develop a software application, such as a software application that makes use of IoT data. API catalog 312 may be included, for example, within a database or other storage that can be cross-referenced using application development module 310. Given the array of various IoT devices 140 available and corresponding IoT data to be obtained, the catalog of APIs may be proportionally large. For example, IoT devices 140 may include parking lot sensors to collect parking information, road sensors to collect traffic information, cameras to capture images in public places, video cameras to capture video and audio in public places, location chips to collect location data pertaining to public transportation vehicles (e.g., buses, subways, trains, etc.), location chips to collect location data pertaining to public service vehicles, mobile phones to collect location data pertaining to the mobile phones and/or the end users, health and fitness devices to collect health monitoring data, and so forth. Correspondingly, the APIs may provide users access to and use of rich linked data that augments and enhances the IoT data obtained via IoT device 140. For example, the catalog of APIs may provide various combinations sub-combinations of the linked data with the IoT data, as well as all the linked data available and the IoT data.

The APIs provide access to and use of IoT data, the linked data, and/or the aggregated data. The APIs may also specify certain operations to be performed in order to use a service and/or data offered by the data service platform 122. For example, an API may define and require a permission before providing access to data pertaining to an IoT device 140, an end device 150 associated with an end user, and so forth.

The APIs include web service technologies (e.g., Simple Object Access Protocol (SOAP), Representational State Transfer (REST), Extensible Markup Language (XML), JavaScript Object Notation (JSON), etc.). Additionally, the APIs may also use other technologies such as dynamic link libraries (DLL) files in C/C++, Java Archive (JAR) files/Remote Method Invocation (RMI) in Java, and so forth.

The APIs include APIs pertaining to various services offered by the service provider of the IoT application framework, which may or may not necessarily be based on IoT devices 140 and/or IoT data. For example, the APIs may provide users access to a video streaming service for an event (e.g., a sporting event, a concert, etc.) or a location (e.g., bars, restaurants, etc.); local information pertaining to bars, restaurants, parking lots, etc; a best route service that determines a best route to a location by taking into account current traffic conditions (e.g., traffic jams, accidents, construction, blocked lanes, no delays (e.g., unobstructed), etc.); a real-time traffic service that provides real-time traffic information and traffic maps; a parking lot service that provides parking lot information to enable end users to find available parking at the cheapest rate; a go-to service that allows end users to search to find various places (e.g., restaurants, gas stations, bars, theaters, etc.), as well as filter search results based on real-time information (e.g., restaurant is crowded, gas station offers gas at cheapest price, etc.); and an advertisement service (e.g., to push ads of various types depending on the location of an end user, etc.).

Application development module 310 provides SDKs that assist users to develop a software application. The SDKs include a set of development tools including, for example, a debugger, software libraries, APIs, documentation, sample code, tutorials, and so forth. The SDKs may provide these tools in an integrated development environment (IDE). The SDKs may allow users to create software applications directed to various operating systems (e.g., Android, iOS, etc.). The software application may be a server-side software application and/or an end user-side software application. The SDKs provide access to and use of the services offered by data service platform 122 and the IoT data, the linked data, and/or the aggregated data.

Software application logic 314 may include logic that provides a management service pertaining to the software application. For example, software application logic 314 allows users to manage the software application, such as on-boarding an update to the software application, providing an over-the-air update service for updating the software application to end devices 150, and so forth.

Referring back to FIG. 1, backhaul network 130 includes one or multiple networks of one or multiple types. According to an exemplary implementation, backhaul network 130 includes a backbone network. For example, the backbone network may be implemented as an optical transport network or other suitable architecture. According to an exemplary implementation, backhaul network 130 provides a connection path to service network 120. For example, IoT device 140 may transmit IoT data to data service platform 122 via access network 105 and backhaul network 130 using a non-access stratum (NAS) control channel. According to an exemplary implementation, when access network 105 is implemented as an LTE RAN or an LTE-A RAN, backhaul network 130 may directly connect to an eNB. According to such an architecture, the IoT data transmitted using the NAS control channel may not traverse network elements of a complimentary part of core network 110.

According to an exemplary embodiment, IoT device 140 includes logic to collect, obtain, and/or generate IoT data as a part of an IoT device service. For example, IoT device 140 may be implemented to include various technologies, such as a sensor, a tag, a camera, an antenna, etc., that collects, obtains, and/or generates IoT data. According to various implementations, IoT device 140 may be a stationary device or a mobile device (e.g., an IoT device 140 attached to a drone, a mobile IoT device, an IoT device embedded or attached to a living organism (e.g., an animal or a person), etc.). IoT device 140 may include a component (e.g., a Global Positioning System (GPS) chipset, etc.) that provides location-aware functionality. IoT device 140 may be powered by an internal source, an external source, a battery, an outlet, electromagnetic waves, and so forth.

According to an exemplary embodiment, IoT device 140 includes a communication interface via which IoT device 140 can transmit and receive data. According to an exemplary embodiment, the communication interface includes an LTE and/or an LTE-A modem (referred to herein as "LTE modem"). The LIE modem transmits and receives data using an LTE NAS control channel as a part of the IoT device service and the IoT data service. According to an exemplary implementation, the LTE NAS control channel can be used to transport small payloads (e.g., 256 bytes or less). For example, IoT device 140 may transmit IoT data to data service platform 122 as a part of an IoT data service and receive data from IoT portal 124 as a part of an IoT management service. According to another implementation, IoT device 140 may transmit IoT data to data service platform 122 via backhaul network 130.

According to other embodiments, the communication interface of IoT device 140 includes a modem other than the LTE modem and IoT device 140 transmits and receives data using conventional or well-known communication technologies other than the LTE NAS control channel. Thus, IoT device 140 may communicate with service network 120 via access network 105, core network 110, and/or backhaul network 130 via the communication interface. IoT device 140 may also communicate with local devices (not illustrated) using various short-range communication technologies. For example, IoT device 140 may obtain IoT data from a sensor as a part of the IoT device service.

According to an exemplary embodiment, IoT device 140 includes logic that supports the IoT services. For example, IoT device 140 includes logic to interpret and execute a command via an API call, which is received via the communication interface. IoT device 140 may also include logic that allows for validating the API call before performing the function or operation of the API call. According to implementations described herein, each IoT device 140 may be registered with service network 120. Registration may indicate the IoT device owner, IoT device ID, IoT device certificate, and IoT device IP address. The registered IoT devices 140 may also be passed through an onboarding process, which makes sure each IoT device has the necessary software (firmware) loaded for security and best practice to maximize network performance. In some implementations, software/firmware upgrades for IoT device 140 can be done securely through a wireless network over the air service, which we can use multicast for large-scale device upgrades.

End device 150 may include a communicative and computational device. End device 150 may be implemented as a mobile device, a portable device, or a stationary device. For example, end device 150 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 150 provides users access to IoT portal 124. For example, end device 150 includes a client, such as a web browser or other suitable software application. Users may be considered an operator of end device 150. For example, a user may be a network administrator, a third party (e.g., a vendor, a merchant), and so forth. Users may use the IoT services provided by the IoT application framework described herein.

Partner server 160 may include a communicative and computational device. In some implementations, partner server 160 may be included in a cloud environment that is separate from service network 120. The partner server 160 may integrate with data service platform 122 through APIs. For example, Partner server 160 may expose service APIs to data service platform 122. In this case, server-to-server connection (e.g., partner server 160-1 to partner server 160-2) may be achieved through IP white listing. In other implementations, a server-to-server connection may also include server certificates for additional protection. In still other implementations, a virtual private network can be deployed.

According to an exemplary embodiment, partner server 160 includes logic that supports IoT services. For example, partner server 160 includes logic to interpret and execute a command via an API call, which is received via the communication interface. Partner server 160 may also include logic that allows for validating the API call before performing the function or operation of the API call.

Link 170 provides a communication path between network elements and/or networks of environment 100. Link 170 may have certain characteristics, such as bandwidth capacity, transmission data rate, and the like.

Figure 4:
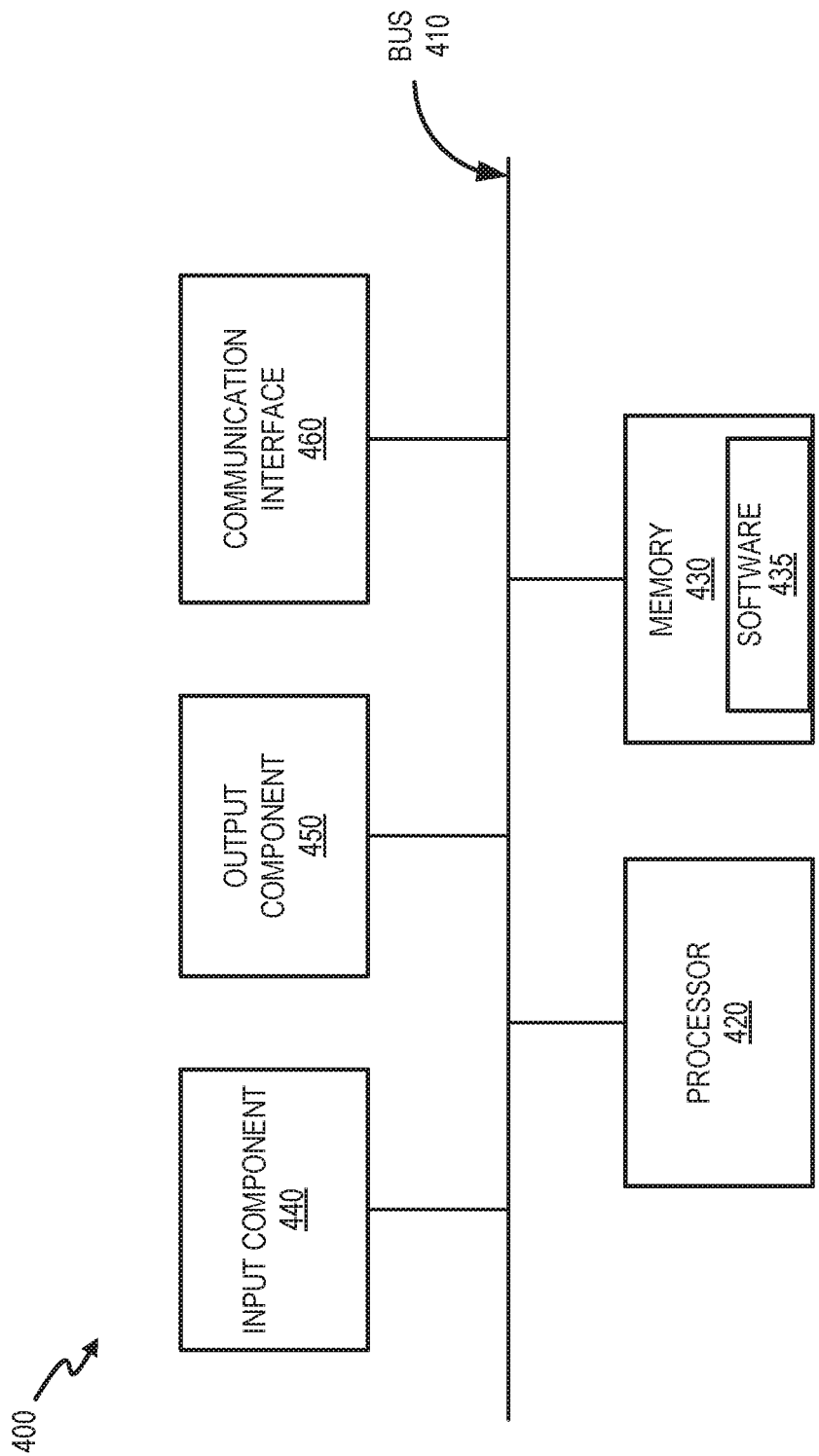
FIG. 4 is a diagram illustrating exemplary components of a device that may correspond to the network elements and an end device depicted in the environment of FIG. 1.

FIG. 4 is a diagram illustrating exemplary physical components of a device 400. Device 400 may correspond to each of the network elements, end devices 150, and/or server devices 160 depicted in environment 100. Device 400 may include a bus 410, a processor 420, a memory 430, an input component 440, an output component 450, and a communication interface 460.

Bus 410 may include a path that permits communication among the components of device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420.

Software 435 includes an application or a program that provides a function and/or a process. Software 435 is also intended to include firmware, middleware, microcode, hardware description language (HDL), and/or other form of instruction. By way of example, with respect to the network elements that include logic to provide the IoT device service, the IoT data service, the IoT management service, and the IoT software application development service with respect to the IoT application framework, these network elements may be implemented to include software 435. Additionally, for example, end device 150 may include software 435 (e.g., an application to communicate to IoT portal 124, etc.) to perform tasks as described herein.

Input component 440 may include a mechanism that permits a user to input information to device 400, such as a keyboard, a keypad, a button, a switch, etc. Output component 450 may include a mechanism that outputs information to the user, such as a display, a speaker, one or more light emitting diodes (LEDs), etc.

Communication interface 460 may include a transceiver that enables device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of RF signals. For example, communication interface 460 may include one or more antennas to transmit and/or receive RF signals over the air. Communication interface 460 may, for example, receive RF signals and transmit them over the air to IoT device 140, and receive RF signals over the air from IoT device 140. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Device 400 may perform certain operations in response to processor 420 executing software instructions (e.g., software 435) contained in a computer-readable medium, such as memory 430. A computer-readable medium may be defined as a non-transitory memory device. A non-transitory memory device may include memory space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Device 400 may include fewer components, additional components, different components, and/or differently arranged components than those illustrated in FIG. 4. As an example, in some implementations, a display may not be included in device 400. In these situations, device 400 may be a "headless" device that does not include input component 440. As another example, device 400 may include one or more switch fabrics instead of, or in addition to, bus 410. Additionally, or alternatively, one or more components of device 400 may perform one or more tasks described as being performed by one or more other components of device 400.

Figure 5:
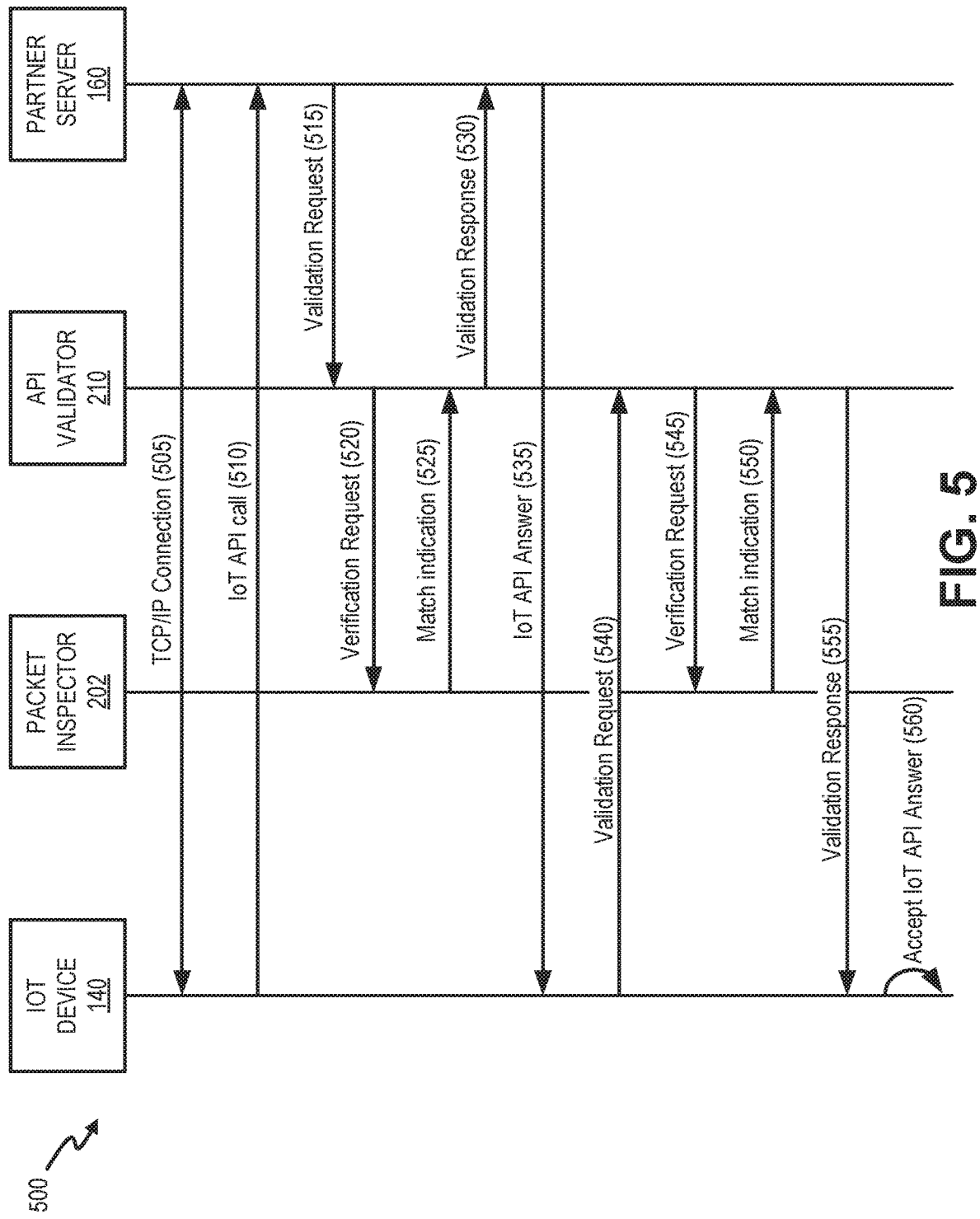
FIG. 5 is a diagram illustrating exemplary communications, in a portion of the network of FIG. 1, to authenticate API calls from an IoT device to a partner server.

FIG. 5 is a diagram illustrating exemplary communications between devices in a portion 500 of network environment 100. Communications in FIG. 5 may represent communications to authenticate API calls from an IoT device to a partner server. As shown in FIG. 5, network portion 500 may include IoT device 140, partner server 160, and packet inspector 202 and API validator 210 of service network 120. IoT device 140, partner server 160, packet inspector 202, and API validator 210 may include functionality described above in connection with, for example, FIGS. 1-4.

IoT device 140 and partner server 160 (any combination of which may be referred to herein collectively as "registered devices") may use embedded device certificates and firmware-over-the-air to update IoT device firmware/software. All API calls initiated from registered devices can be validated against network layer data packets made by these data calls on a higher layer (e.g., Open Systems Interconnection (OSI) model layers or other layers). For example, in the arrangement of FIG. 5, IoT device 140 may be a sensor that reports data to partner server 160 via data service platform 122. As described below, API validator 210 will validate an initial IoT API call from IoT device 140 to make sure the call is indeed from the claimed sensor.

Referring to FIG. 5, IoT device 140 and partner server 160 may establish a TCP/IP connection, as indicated by reference number 505. When IoT device 140 (which has previously been registered with service network 120) makes an IoT API call 510 to partner server 160, partner server 160 will authenticate IoT device 140 using API validator 210 of data service platform 122. In response to IoT API call 510, partner server 160 may initiate a validation request 515 to API validator 210. Validation request 515 may include packet information that may be later used to compare with real-time flow data from a network layer.

Figure 6:
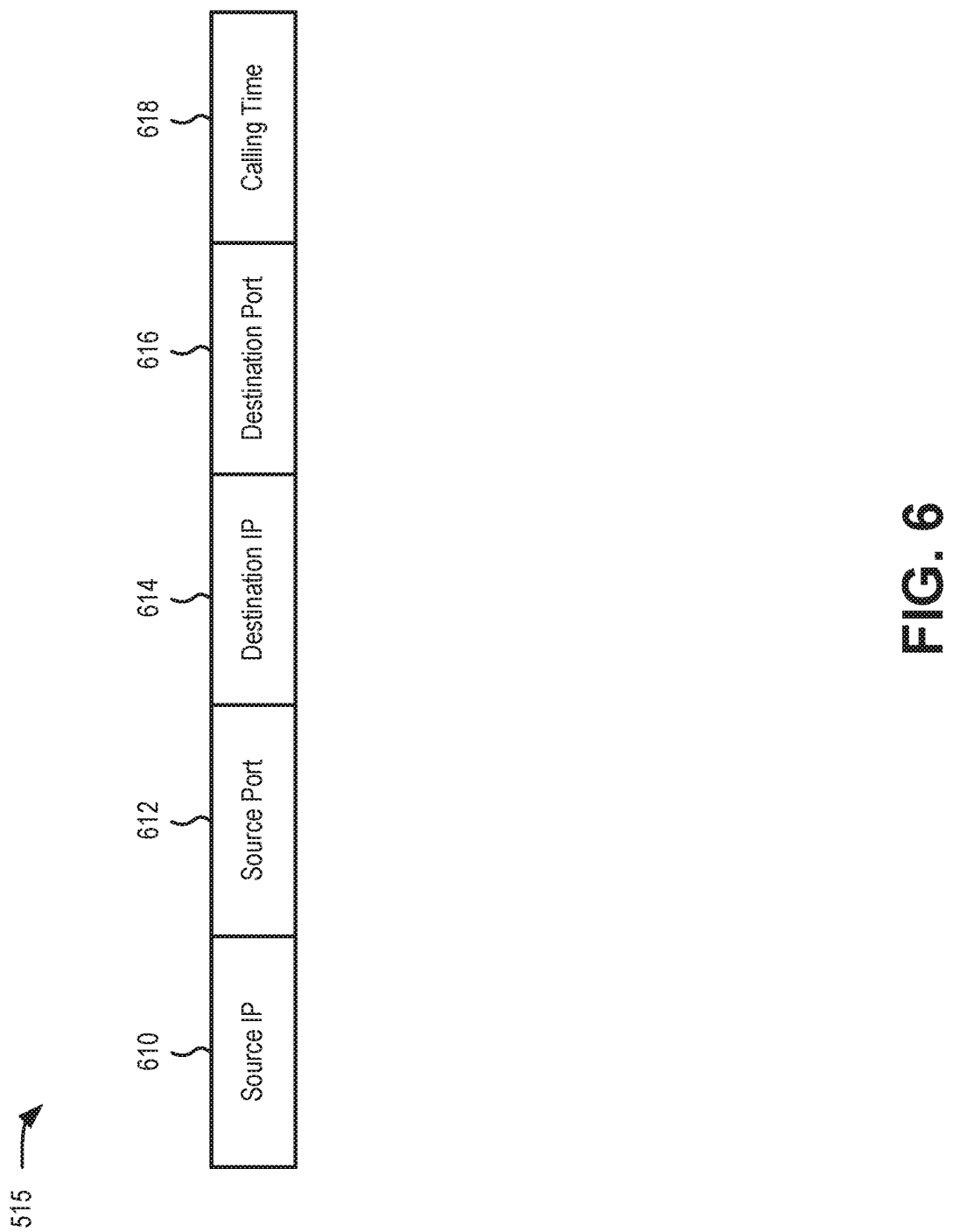
FIG. 6 is an illustration of exemplary data fields in a validation request.

FIG. 6 is an illustration of exemplary data fields for the packet information in validation request 515. As shown in FIG. 6, validation request 515 may include a source IP address field 610, a source port field 612, a destination IP address field 614, a destination port field 616, and a calling time field 618 for a particular IoT API call 510. Particularly, the source IP address, source port, destination IP address, destination port, and calling time form what is referred to herein as a "five-tuple" that can be used to identify the flow to which a particular packet belongs. The source IP address field 610 corresponds to the IP address of IoT device 140 for TCP/IP connection 505. The source port field 612 corresponds to the port used by IoT device 140. The destination IP address field 614 and destination port field 616 include the IP address and port of partner server 160 used to receive IoT API call 510. The calling time corresponds to the time of IoT API call 510 from IoT device 140 to partner server 160. The fields depicted in FIG. 6 are illustrative. In practice, validation request 515 may include additional or different fields.

Returning to FIG. 5, partner server 160 may capture two parts of the five-tuple—the source IP address and the source port from TCP flow information from a lower layer, such as the network connection layer. Partner server 160 may combine them together with the server IP address (e.g., destination IP address), server port (e.g., destination port), and calling time to form the five-tuple for validation request 515, which is sent to API validator 210. API validator 210 may receive validation request 515 and pass the five-tuple, namely <calling device IP>, <calling device port>, <server IP>, <server port>, and <calling time>, to packet inspector 202 for verification, as shown by verification request 520. Packet inspector 202 may verify, in real time, if such data flow with a matching five-tuple is in the network and provide a match indication 525 to API validator 210. API validator 210 may, in turn, provide a validation response 530 to partner server 160. In other implementations, validation request 515 may also include an identifier for IoT device 140. For example, if a device identifier is included with IoT API call 510, then partner server 160 may include the device identifier in validation request 515 and packet inspector 202 can validate the device information. Packet inspector 202 may store, for example, an IoT device ID, type, owner, etc., associated with each IoT device 140.

If authentication not is successful (e.g., validation response 530 indicates there is not a match between the five-tuple in validation request 515 and the TCP flow data stored in the service network 120), then partner server 160 will reject IoT API call 510 (not shown in FIG. 5). If authentication is successful (e.g., validation response 530 indicates a match between the five-tuple in validation request 515 and the TCP flow data), then partner server 160 will respond to IoT API call 510 and return the necessary payload back to IoT device 140, as indicated by reference 535.

IoT device 140 may receive IoT API answer 535 from partner server 160. However, before IoT device 140 accepts the payload from IoT API answer 535, IoT device 140 may validate partner server 160 through API validator 210. IoT device 140 will capture from the network layer its own five-tuple for IoT API answer 535 (e.g., <server IP>, <server port>, <IoT device IP>, <IoT device port> and <calling time>). IoT device 140 may provide validation request 540, including the five-tuple, to API validator 210. API validator 210 may receive validation request 540 and pass the TCP flow information, namely <server IP>, <server port>, <IoT device IP>, <IoT device port>, and <calling time>, to packet inspector 202 for verification, as shown by verification request 545. Packet inspector 202, in turn, may verify, in real time, if such data flow with a matching five-tuple is in the network and provide a match indication 550 to API validator 210. API validator 210 may, in turn, provide a validation response 555 to IoT device 140. In other implementations, validation request 540 may also include an identifier for partner server 160. For example, if a server identifier is included with IoT API answer 540, then IoT device 140 may include the server identifier in validation request 540 and packet inspector 202 can validate the device information. Packet inspector 202 may store, for example, a server ID, certificates, IP white list, owner, etc., associated with each partner server 160.

If authentication is not successful (e.g., validation response 555 indicates there is not a match between the five-tuple in validation request 540 and the TCP flow data stored in the service network 120), then IoT device 140 will reject IoT API answer 535 (not shown in FIG. 5). If authentication is successful (e.g., validation response 555 indicates a match between the five-tuple in validation request 540 and the TCP flow data), then IoT device 140 will accept 560 the payload from partner server 160 and complete the API call process.

Figure 7:
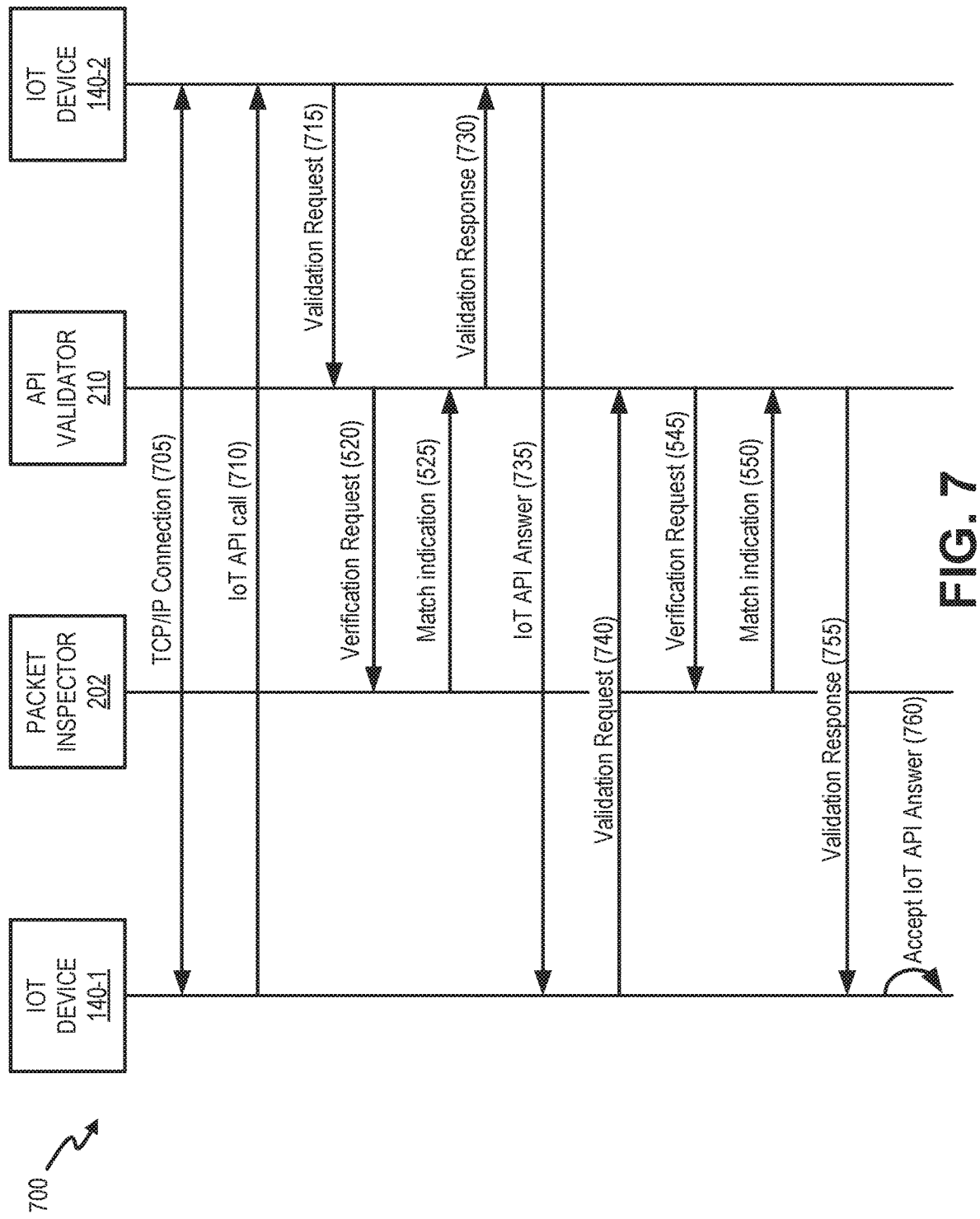
FIG. 7 is a diagram illustrating exemplary communications, in a portion of the network of FIG. 1, to authenticate API calls from an IoT device to another IoT device.

FIG. 7 is a block diagram illustrating exemplary communications between devices in a portion 700 of network environment 100. Communications in FIG. 7 may represent communications to authenticate API calls from an IoT device to another IoT device. As shown in FIG. 7, network portion 700 may include IoT devices 140-1 and 140-2, packet inspector 202, and API validator 210.

Referring to FIG. 7, IoT device 140-1 and IoT device 140-2 may establish a TCP/IP connection, as indicated by reference number 705. When IoT device 140-1 (which has previously been registered with service network 120) makes an IoT API call 710 to IoT device 140-2, IoT device 140-2 will authenticate IoT device 140-1 using API validator 210 of data service platform 122. In response to IoT API call 710, IoT device 140-2 may initiate a validation request 715 to API validator 210. Similar to validation request 515 described above, validation request 715 may include a five-tuple including a source IP address (e.g., of IoT device 140-1), source port (e.g., of IoT device 140-1), destination IP address (e.g., of IoT device 110-2), destination port (e.g., of IoT device 140-2), and calling time that can be used to identify the flow to which IoT API call 710 belongs.

Similar to the description above in connection with FIG. 5, API validator 210 and packet inspector 202 may exchange a verification request 520 and match indication 525 to determine whether IoT API call 710 descriptors match network layer data packets made by IoT API call 710 on another network layer. API validator 210 may provide a corresponding validation response 730 to IoT device 140-2. If authentication is successful (e.g., validation response 730 indicates a match between the five-tuple in validation request 715 and the TCP flow data), then IoT device 140-2 will respond to IoT API call 710 and return the requested payload back to the IoT device 140-1, as indicated by reference 735.

IoT device 140-1 may receive IoT API answer 735 from IoT device 140-2. However, before IoT device 140-1 accepts the payload from IoT API answer 735, IoT device 140-1 may validate IoT device 140-2 through API validator 210 using procedures similar to those described above. Particularly, IoT device 140-1 may submit a validation request 740 that includes a five-tuple for IoT API answer 735. Validation request 740 may include a five-tuple including a source IP address (e.g., of IoT device 140-2), source port (e.g., of IoT device 140-2), destination IP address (e.g., of IoT device 140-1), destination port (e.g., of IoT device 140-1), and calling time that can be used to identify the flow to which IoT API answer 735 belongs.

API validator 210 and packet inspector 202 may exchange a verification request 545 and match indication 550 to determine whether IoT API answer 735 descriptors match network layer data packets made by IoT API answer 735 on another network layer. API validator 210 may provide a corresponding validation response 755 to IoT device 140-1. Assuming authentication is successful (e.g., validation response 755 indicates a match between the five-tuple in validation request 740 and the TCP flow data), then IoT device 140-1 will accept 760 the payload from IoT device 140-2 and complete the API call process.

Figure 8:
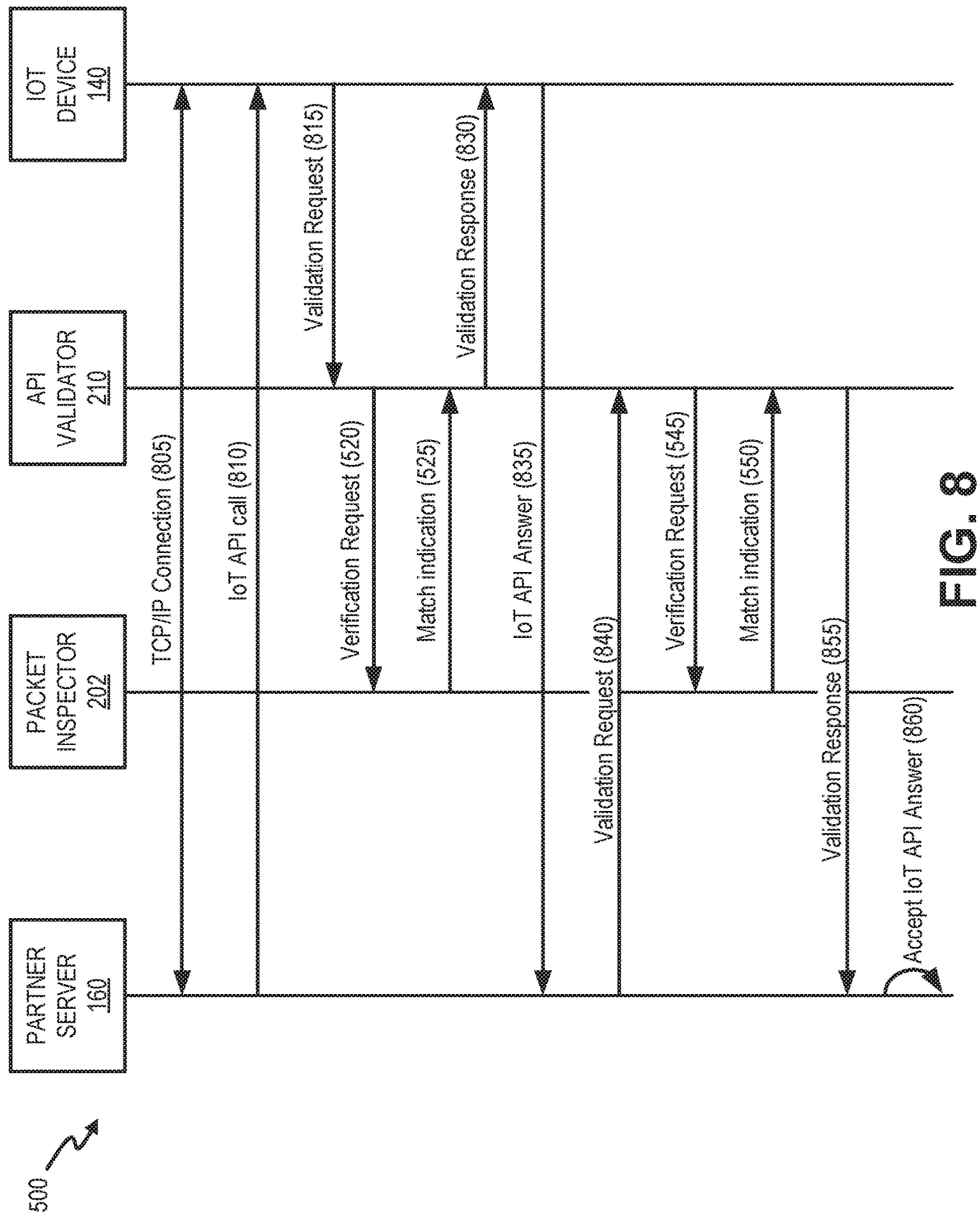
FIG. 8 is a diagram illustrating exemplary communications, in a portion of the network of FIG. 1, to authenticate API calls from a partner server to an IoT device.

FIG. 8 is a block diagram illustrating exemplary communications between devices in portion 500 of network environment 100. Communications in FIG. 8 may represent communications to authenticate API calls from a partner server to an IoT device. For example, when partner server 160 issues an API control command via data service platform 122, IoT device 140 (such as a sensor) may validate that the API call is indeed from an authenticated server.

Referring to FIG. 8, partner server 160 and IoT device 140 may establish a TCP/IP connection, as indicated by reference number 805. When partner server 160 makes an IoT API call 810 to IoT device 140, IoT device 140 will authenticate partner server 160 using API validator 210. In response to IoT API call 810, IoT device 140 may initiate a validation request 815 to API validator 210. Similar to validation request 515 described above, validation request 815 may include a five-tuple including a source IP address (e.g., of partner server 160), source port (e.g., of partner server 160), destination IP address (e.g., of IoT device 140), destination port (e.g., of IoT device 140), and calling time that can be used to identify the flow to which IoT API call 810 belongs.

Similar to the description above in connection with FIG. 5, API validator 210 and packet inspector 202 may exchange a verification request 520 and match indication 525 to determine whether IoT API call 810 descriptors match network layer data packets made by IoT API call 810 on another network layer. API validator 210 may provide a corresponding validation response 830 to IoT device 140. If authentication is successful (e.g., validation response 830 indicates a match between the five-tuple in validation request 815 and the TCP flow data), then IoT device 140 will respond to IoT API call 810 and return the requested payload back to partner server 160, as indicated by reference 835.

Partner server 160 may receive IoT API answer 835 from IoT device 140. Before partner server 160 accepts the payload from IoT API answer 835, partner server 160 may validate IoT device 140 through API validator 210 using procedures similar to those described above. Particularly, partner server 160 may submit a validation request 840 that includes a five-tuple for IoT API answer 835. Validation request 840 may include a five-tuple including a source IP address (e.g., of IoT device 140), source port (e.g., of IoT device 140), destination IP address (e.g., of partner server 160), destination port (e.g., of partner server 160), and calling time that can used to identify the flow to which IoT API answer 835 belongs.

API validator 210 and packet inspector 202 may exchange a verification request 545 and match indication 550 to determine whether IoT API answer 835 descriptors match network layer data packets made by IoT API answer 835 on another network layer. API validator 210 may provide a corresponding validation response 855 to IoT device 140-1. Assuming authentication is successful (e.g., validation response 855 indicates a match between the five-tuple in validation request 840 and the TCP flow data), then partner server 160 will accept 860 the payload from IoT device 140 and complete the API call process.

Figure 9:
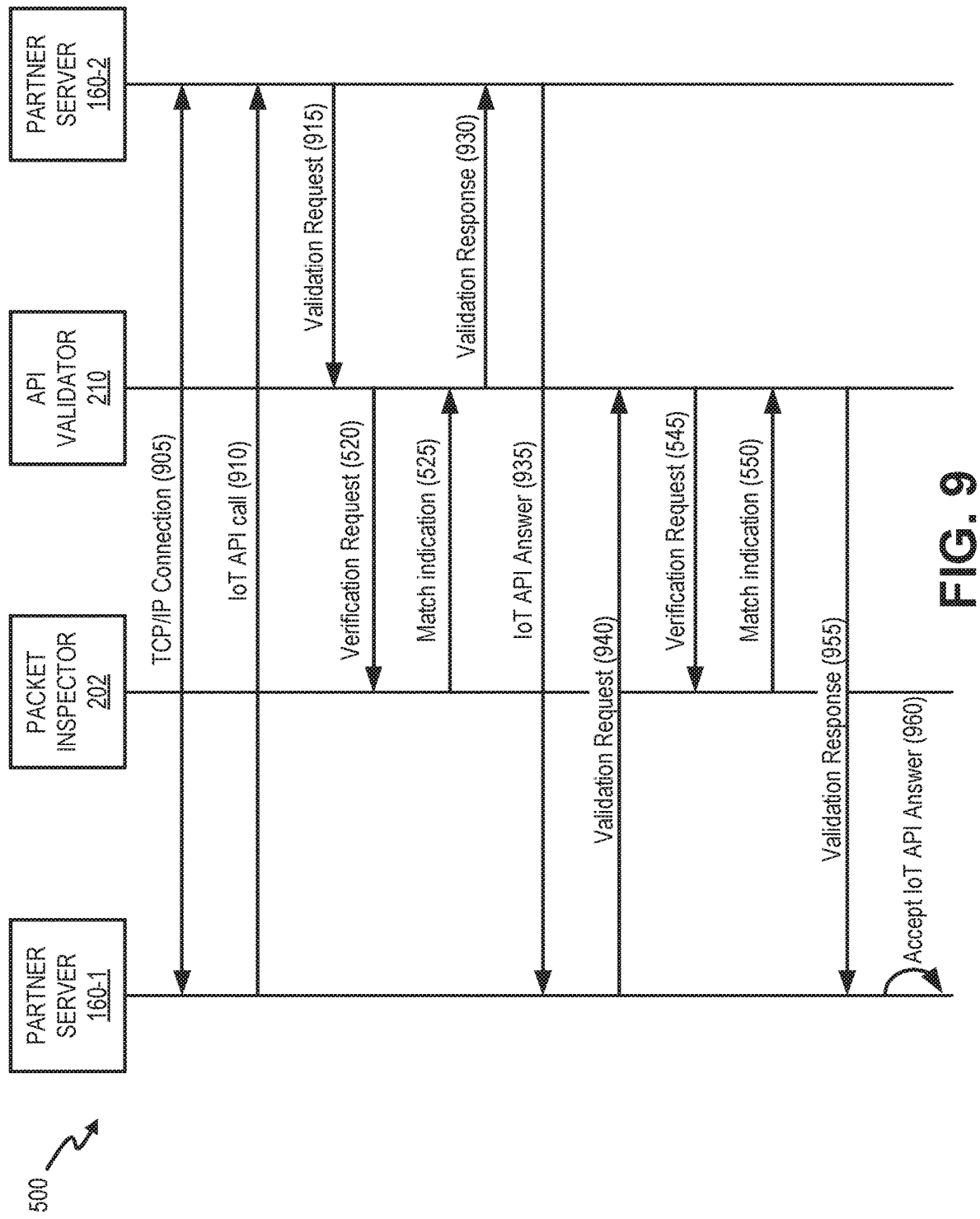
FIG. 9 is a diagram illustrating exemplary communications, in a portion of the network of FIG. 1, to authenticate API calls from a partner server to another partner server.

FIG. 9 is a block diagram illustrating exemplary communications between devices in a portion 900 of network environment 100. Communications in FIG. 9 may represent communications to authenticate API cells from a partner server to another partner server. As shown in FIG. 9, network portion 900 may include partner servers 160-1 and 160-2, packet inspector 202, and API validator 210.

Referring to FIG. 9, assume both partner servers 160 have previously been registered with service network 120 such that IoT API calls will be routed through data service platform 122. Partner server 160-1 and partner server 160-2 may establish a TCP/IP connection, as indicated by reference number 905. When partner server 160-1 makes an IoT API call 910 to partner server 160-2, partner server 160-2 will authenticate partner server 160-1 using API validator 210 of data service platform 122. In response to IoT API call 910, partner server 160-2 may initiate a validation request 915 to API validator 210. Similar to validation request 515 described above, validation request 915 may include a five-tuple including a source IP address (e.g., of partner server 160-1), source port (e.g., of partner server 160-1), destination IP address (e.g., of partner server 160-2), destination port (e.g., of partner server 160-2), and calling time that can be used to identify the flow to which IoT API call 910 belongs.

Similar to the description above in connection with FIG. 5, API validator 210 and packet inspector 202 may exchange a verification request 520 and match indication 525 to determine whether IoT API call 910 descriptors match network layer data packets made by IoT API call 910 on another network layer. API validator 210 may provide a corresponding validation response 930 to partner server 160-2. If authentication is successful (e.g., validation response 930 indicates a match between the five-tuple in validation request 915 and the TCP flow data), then partner server 160-2 will respond to IoT API call 910 and return the requested payload back to the partner server 160-1, as indicated by reference 935.

Partner server 160-1 may receive IoT API answer 935 from partner server 160-2. However, before partner server 160-1 accepts the payload from IoT API answer 935, partner server 160-1 may validate partner server 160-2 through API validator 210 using procedures similar to those described above. Particularly, partner server 160-1 may submit a validation request 940 that includes a five-tuple for IoT API answer 935. Validation request 940 may include a five-tuple including a source IP address (e.g., of partner server 160-2), source port (e.g., of partner server 160-2), destination IP address of partner server 160-1), destination port (e.g., of partner server 160-1), and calling time that can be used to identify the flow to which IoT API answer 935 belongs.

API validator 210 and packet inspector 202 may exchange a verification request 545 and match indication 550 to determine whether IoT API answer 935 descriptors match network layer data packets made by IoT API answer 935 on another network layer. API validator 210 may provide a corresponding validation response 955 to partner server 160-1. Assuming authentication is successful (e.g., validation response 955 indicates a match between the five-tuple in validation request 940 and the TCP flow data), then partner server 160-1 will accept 960 the payload from partner server 160-2 and complete the API call process.

Figure 10:
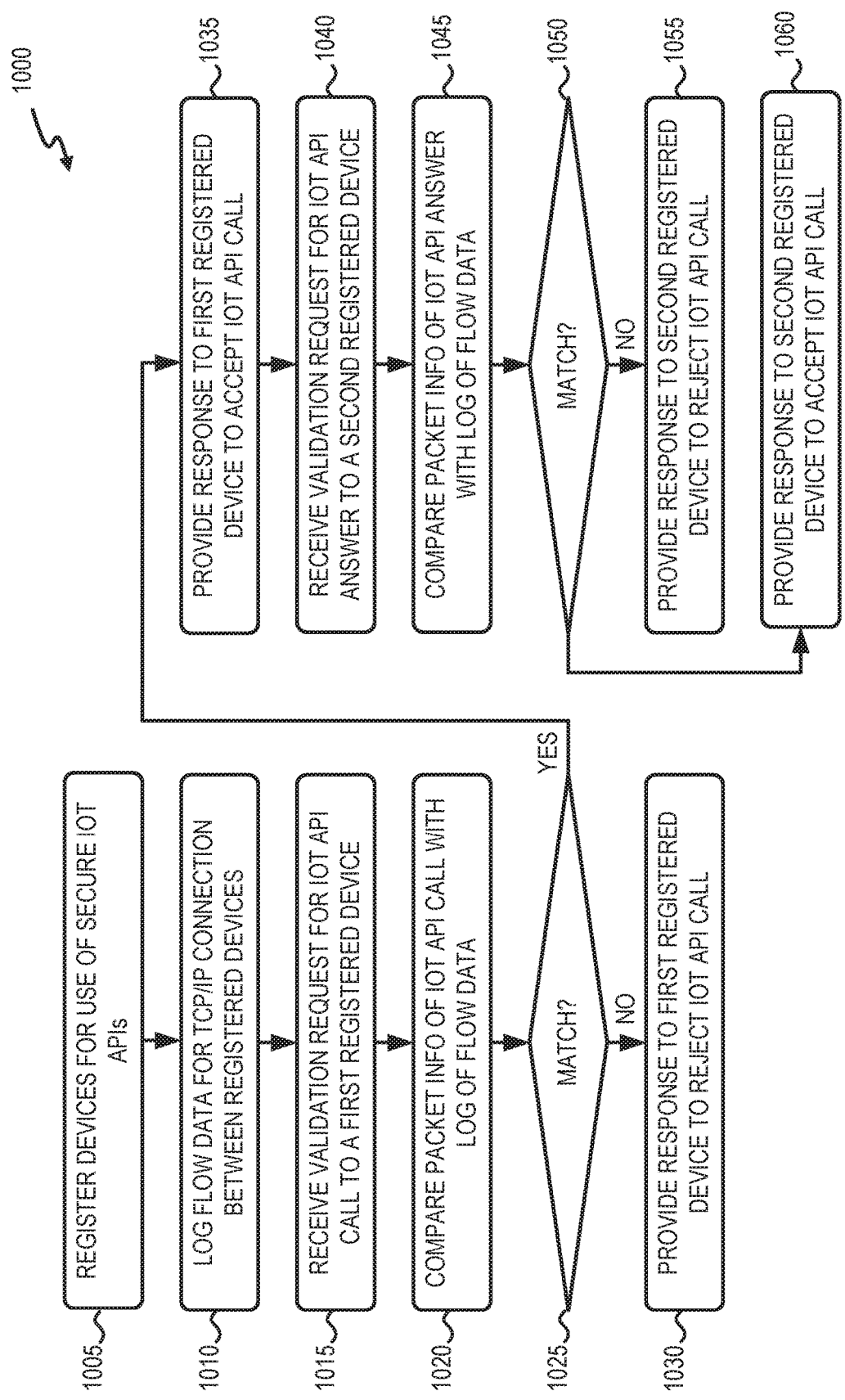
FIG. 10 is a flow diagram illustrating an exemplary process for authenticating IoT API calls between registered devices in a network, according to an implementation described herein.

FIG. 10 is a flow diagram illustrating an exemplary process 1000 for authenticating IoT API calls between network devices in a network. In one implementation, process 1000 may be implemented by devices in data service platform 122. In another implementation, process 1000 may be implemented by data service platform 2 in conjunction with one or more other devices in network environment 100, such as IoT devices 140 and partner servers 160.

Process 1000 may include registering devices for use of secure IoT APIs (block 1005) and logging TCP flow data for connections between registered devices (block 1010). For example, partners may use end devices 150 to register IoT devices 140 and partner servers 160 with service network 120 and/or data service platform 122. In one implementation, end devices 150 may register IoT devices 140 and partner servers 160 via IoT portal 124. TCP/IP sessions (e.g., TCP/IP connection 505) between any combination of registered IoT devices 140 and partner servers 160 (i.e., "registered devices") may pass through service network 120, where packet inspector 202 may log TCP flow data for each session. TCP flow data for each TCP session may include, for example, network layer (e.g., OSI layer 3) flow data, such as a source IP address, a source port, a destination IP address, a destination port, and a connection time.

Process 1000 may also include receiving a validation request from an IoT API call directed to a first registered device (block 1015), comparing packet information of the IoT API call with the logged TCP flow data (block 1020), and detecting if there is a match of the packet information and logged TCP flow data (block 1025). For example, as described in connection with FIG. 5, in response to an IoT API call 510, partner server 160 may send validation request 515 to data service platform 122 (e.g., API validator 210). The validation request may include a five-tuple identification for a packet that carried the IoT API call. The five-tuple identification may be collected, at least in part, by partner server 160 from session layer data (e.g., OSI layer 5). Other examples of validation requests include validation requests 715 for IoT device 140-2, validation request 815 from IoT device 140, and validation request 915 from partner server 160-2. API validator 210 may receive the validation request and compare the five-tuple with logged TCP flow data from packet inspector 202. Particularly, API validator 210 and/or packet inspector 202 may determine if each part of the five-tuple matches a current TCP session flow in the packet inspector log.

If there is not a match of the packet information and logged TCP flow data (block 1025—NO), process 1000 may further include providing a response to the first registered device to reject the IoT API call (block 1030). For example, as described in connection with FIG. 5, if API validator 210 does not receive a valid match indication for the five-tuple in validation request 515, API validator 210 may send a validation response 530 that directs partner server 160 to reject IoT API call 510.

If there is a match of the packet information and logged TCP flow data (block 1025—YES), process 1000 may further include providing a response to the first registered device to accept the IoT API call (block 1035) and receiving a validation request for an IoT API answer to a second registered device (block 1040). For example, as described in connection with FIG. 5, if API validator 210 receives a valid match indication for the five-tuple in validation request 515, API validator 210 may send a validation response 530 that directs IoT device 140 to accept IoT API call 510. Partner server 160 may then send IoT API answer 535 to IoT device 140, which may initiate another validation request 540 from IoT device 140. Similar to validation request 515 from partner server 160, validation request 540 may include a five-tuple identification for a packet that carried IoT API answer 535. Other examples of validation requests include validation requests 740 for IoT device 140-1, validation request 840 from partner server 160, and validation request 940 from partner server 160-1.

Process 1000 may additionally include comparing packet information of the IoT API answer with the logged TCP flow data (block 1045), and detecting if there is a match of the packet information and logged TCP flow data (block 1050). For example, as described in connection with FIG. 5, API validator 210 may receive validation request 940 and compare the five-tuple with logged TCP flow data from packet inspector 202. Particularly, API validator 210 and/or packet inspector 202 may determine if each part of the five-tuple matches a current TCP session flow in the packet inspector log.

If there is match of the packet information and logged TCP flow data (block 1050—NO), process 1000 may further include providing a response to the second registered device to reject the IoT API answer (block 1055). For example, as described in connection with FIG. 5, if API validator 210 does not receive a valid match indication for the five-tuple in validation request 540, API validator 210 may send a validation response 555 that directs IoT device 140 to reject IoT API answer 535.

If there is a match of the packet information and logged TCP flow data (block 1050—YES), process 1000 may further include providing a response to the second registered device to accept the IoT API answer (block 1060). For example, as described in connection with FIG. 5, if API validator 210 receives a valid match indication for the five-tuple in validation request 540, API validator 210 may send a validation response 555 that directs IoT device 140 to accept IoT API answer 535.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 10, and message/operation flows with respect to FIGS. 5, and 7-9, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
registering devices for a data service to create registered devices, wherein the data service is configured to route application programming interface (API) calls between the registered devices through a data service platform for secure Internet of Things (IoT) API calls;
maintaining, by a network device in the data service platform, a real-time log of transmission control protocol (TCP) flow data for connections between the registered devices, wherein the real-time log includes logged TCP flow data for current TCP session flows, wherein the logged TCP flow data includes, for each of the connections, a first five-tuple of:
a source Internet protocol (IP) address, a source port identifier,
a destination IP address,
a destination port identifier, and
a connection time;
receiving, by the network device and from a first registered device of the registered devices, a call validation request for an IoT API call directed to the first registered device from a second registered device of the registered devices, wherein the call validation request includes packet information of the IoT API call including a second five-tuple of:
an IP address of the second registered device used to send the IoT API call,
a port identifier of the second registered device used to send the IoT API call,
an IP address of the first registered device used to receive the IoT API call,
a destination port identifier of the first registered device used to receive the IoT API call, and
a calling time for the IoT API call;
comparing, by the network device, the packet information of the IoT API call, including the second five-tuple, with the logged TCP flow data for the current TCP session flows, including the first five-tuple;
sending, by the network device, a response to the first registered device to accept the IoT API call, when the comparing indicates a match of the second five-tuple from the packet information and one of the first five-tuples in the logged TCP flow data; and
sending, by the network device, a response to the first registered device to reject the IoT API call, when the comparing indicates no match of the second five-tuple from the packet information and any of the first five-tuples in the logged TCP flow data.

2. The method of claim 1, wherein the logged TCP flow data for current TCP session flows is obtained from a packet filtering method.

3. The method of claim 1, wherein the packet information included in the call validation request further includes:
a device identifier for the second registered device.

4. The method of claim 1, further comprising:
receiving, by the network device and from the second registered device, an answer validation request for an IoT API answer directed to the second registered device from the first registered device, wherein the answer validation request includes other packet information of the IoT API answer;
comparing, by the network device, the other packet information with the logged TCP flow data;
providing, by the network device, a response to the second registered device to accept the IoT API answer, when the comparing indicates a match of the other packet information and the logged TCP flow data; and
providing, by the network device, a response to the second registered device to reject the IoT API answer, when the comparing indicates no match of the other packet information and the logged TCP flow data.

5. The method of claim 4, wherein the other packet information included in the answer validation request includes:
an Internet protocol (IP) address of the first registered device used to send the IoT API answer,
a port of the first registered device used to send the IoT API answer,
an IP address of the second registered device used to receive the IoT API answer,
a destination port of the second registered device used to receive the IoT API answer, and
a calling time for the IoT API answer.

6. The method of claim 1, wherein the first registered device includes a server device and wherein the second registered device includes a machine-type communication (MTC) device.

7. The method of claim 1, wherein the first registered device includes a machine-type communication (MTC) device.

8. The method of claim 1, wherein at least some of the logged TCP flow data is obtained from a network layer of a protocol stack.

9. The method of claim 8, wherein at least some of the packet information from the first registered IP device is obtained from a different layer than the network layer.

10. The method of claim 9, wherein the logged TCP flow data for current TCP session flows is obtained from a packet filtering method.

11. One or more network devices, comprising:
one or more memory devices for storing instructions; and
one or more processors configured to execute the instructions to:
register devices for a data service to create registered devices, wherein the data service is configured to route application programming interface (API) calls between the registered devices through a data service platform for secure Internet of Things (IoT) API calls;
maintain a real-time log of transmission control protocol (TCP) flow data for connections between the registered devices, wherein the real-time log includes logged TCP flow data for current TCP session flows, wherein the logged TCP flow data includes, for each of the connections, a first five-tuple of:
a source Internet protocol (IP) address,
a source port identifier,
a destination IP address,
a destination port identifier, and
a connection time;
receive, from a first registered device of the registered devices, a call validation request for an IoT API call directed to the first registered device from a second registered device of the registered devices, wherein the call validation request includes packet information of the IoT API call including a second five-tuple of:
an IP address of the second registered device used to send the IoT API call,
a port identifier of the second registered device used to send the IoT API call,
an IP address of the first registered device used to receive the IoT API call,
a destination port identifier of the first registered device used to receive the IoT API call, and
a calling time for the IoT API call;
compare the packet information of the IoT API call, including the second five-tuple, with the logged TCP flow data for the current TCP session flows, including the first five-tuple;
send a response to the first registered device to accept the IoT API call, when the comparing indicates a match of the second five-tuple from the packet information and one of the first five-tuples in the logged TCP flow data; and send a response to the first registered device to reject the IoT API call, when the comparing indicates no match of the second five-tuple from the packet information and any of the first five-tuples in the logged TCP flow data.

12. The one or more network devices of claim 11, wherein the logged TCP flow data for current TCP session flows is obtained from a packet filtering method.

13. The one or more network devices of claim 11, wherein the packet information included in the call validation request further includes a device identifier for the second registered device.

14. The one or more network devices of claim 11, wherein the one or more processors are further configured to execute the instructions to:
receive, from the second registered device, an answer validation request for an IoT API answer directed to the second registered device from the first registered device, wherein the answer validation request includes other packet information of the IoT API answer;
compare the other packet information with the logged TCP flow data;
provide a response to the second registered device to accept the IoT API answer, when the comparing indicates a match of the other packet information and the logged TCP flow data; and
provide a response to the second registered device to reject the IoT API answer, when the comparing indicates no match of the other packet information and the logged TCP flow data.

15. The one or more network devices of claim 14, wherein the other packet information included in the answer validation request includes:
an Internet protocol (IP) address of the first registered device used to send the IoT API answer,
a port of the first registered device used to send the IoT API answer,
an IP address of the second registered device used to receive the IoT API answer,
a destination port of the second registered device used to receive the IoT API answer, and a calling time for the IoT API answer.

16. The one or more network devices of claim 11, wherein the first registered device includes a server device and wherein the second registered device includes a machine-type communication (MTC) device.

17. The one or more network devices of claim 11, wherein the first registered device includes a machine-type communication (MTC) device, and wherein the second registered device includes a different MTC device.

18. The one or more network devices of claim 11, wherein at least some of the logged TCP flow data is obtained from a network layer of a protocol stack.

19. A non-transitory computer-readable medium containing instructions executable by at least one processor, the computer-readable medium comprising one or more instructions to:
register devices for a data service to create registered devices, wherein the data service is configured to route application programming interface (API) calls between the registered devices through a data service platform for secure Internet of Things (IoT) API calls;
maintain a real-time log of transmission control protocol (TCP) flow data for connections between the registered devices, wherein the real-time log includes logged TCP flow data for current TCP session flows, wherein the logged TCP flow data includes, for each of the connections, a first five-tuple of:
a source Internet protocol (IP) address,
a source port identifier,
a destination IP address,
a destination port identifier, and
a connection time;
receive, from a first registered device of the registered devices, a call validation request for an IoT API call directed to the first registered device from a second registered device of the registered devices, wherein the call validation request includes packet information of the IoT API call including a second five-tuple of:
an IP address of the second registered device used to send the IoT API call,
a port identifier of the second registered device used to send the IoT API call,
an IP address of the first registered device used to receive the IoT API call,
a destination port identifier of the first registered device used to receive the IoT API call, and
a calling time for the IoT API call;
compare the packet information of the IoT API call, including the second five-tuple, with the logged TCP flow data for the current TCP session flows, including the first five-tuple;
send a response to the first registered device to accept the IoT API call, when the comparing indicates a match of the second five-tuple from the packet information and one of the first five-tuples in the logged TCP flow data; and
send a response to the first registered device to reject the IoT API call, when the comparing indicates no match of the second five-tuple from the packet information and any of the first five-tuples in the logged TCP flow data.

20. The non-transitory computer-readable medium claim 19, further comprising one or more instructions to:
receive, from the second registered device, an answer validation request for an IoT API answer directed to the second registered device from the first registered device, wherein the answer validation request includes other packet information of the IoT API answer;
compare the other packet information with the logged TCP flow data;
provide a response to the second registered device to accept the IoT API answer, when the comparing indicates a match of the other packet information and the logged TCP flow data; and
provide a response to the second registered device to reject the IoT API answer, when the comparing indicates no match of the other packet information and the logged TCP flow data.

* * * * *